(12) United States Patent
Jung (10) Patent No.: US 7,915,594 B2
(45) Date of Patent: Mar. 29, 2011

(54) X-RAY DETECTOR AND METHOD OF DRIVING THE SAME

(75) Inventor: Kwan-Wook Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 51 days.

(21) Appl. No.: 12/538,284

(22) Filed: Aug. 10, 2009

(65) Prior Publication Data

US 2010/0155613 A1 Jun. 24, 2010

(30) Foreign Application Priority Data

Dec. 24, 2008 (KR) ........................ 10-2008-0133628

(51) Int. Cl.
*G01T 1/24* (2006.01)
(52) U.S. Cl. ................................. 250/370.09
(58) Field of Classification Search .............. 250/252.1, 250/370.08, 370.09, 370.11; 378/62, 98.8
See application file for complete search history.

(56) References Cited

U.S. PATENT DOCUMENTS

| | | | |
|---|---|---|---|
| 5,920,070 A | 7/1999 | Petrick et al. | |
| 6,904,126 B2 * | 6/2005 | Endo | 378/98.8 |
| 2007/0040099 A1 * | 2/2007 | Yokoyama et al. | 250/208.1 |
| 2007/0125952 A1 * | 6/2007 | Endo et al. | 250/369 |

FOREIGN PATENT DOCUMENTS

| | | |
|---|---|---|
| JP | 2004-343525 | 12/2004 |
| JP | 2006-075359 | 3/2006 |
| JP | 2007-075598 | 3/2007 |

* cited by examiner

*Primary Examiner* — David P Porta
*Assistant Examiner* — Marcus H Taningco
(74) *Attorney, Agent, or Firm* — F. Chau & Associates, LLC

(57) ABSTRACT

An X-ray detector and method of driving an X-ray detector include an X-ray detector having a detection module that includes a plurality of gate lines and a plurality of photoelectric transducers connected to the gate lines, respectively, to convert X-ray radiation into an electric signal, a data reading module that sequentially scans the gate lines, generates a dummy dark level, by reading electric signals of the photoelectric transducers during a standby period, generates an offset dark level, by reading the electric signals from the photoelectric transducers, before X-ray radiating a specimen, and generates a bright level by reading the electric signals from the photoelectric signals after the irradiation of the specimen during an X-ray radiation period, and a data processing module that ignores the dummy dark level and generates image data using only the bright level and the offset dark level.

20 Claims, 7 Drawing Sheets

X-RAY DETECTOR AND METHOD OF DRIVING THE SAME

CROSS-REFERENCE TO RELATED APPLICATION

This application claims priority from Korean Patent Application No. 10-2008-0133628 filed on Dec. 24, 2008 in the Korean Intellectual Property Office, the disclosure of which is incorporated herein by reference in its entirety.

BACKGROUND

The present disclosure relates to an X-ray detector and a method of driving the same.

Conventionally, X-ray detectors, which are a type of diagnostic radiation detector, require the photographing of specimens using X-ray sensitive films and the developing of the X-ray sensitive films in order to provide X-ray detection results for analysis.

With recent developments in semiconductor technology, research has been conducted on digital X-ray detectors using thin-film transistors (TFTs). Digital X-ray detectors use TFTs as switching devices and can thus readily provide X-ray detection results without the need to expose and develop films.

Initial image data obtained using TFTs, however, include not only signal components corresponding to the amount of radiation received but also offset components generated by, for example, leakage currents. Therefore, it is necessary to develop a technique for acquiring precise image data by acquiring stable offset components and correcting initial image data by removing adverse effects caused by the offset components.

SUMMARY OF THE INVENTION

Exemplary embodiments of the present invention provide an X-ray detector having improved reliability.

Exemplary embodiments of the present invention also provide a method of driving an X-ray detector having improved reliability.

The above and other objects of the present invention will be described in or be understood from the following description of exemplary embodiments.

According to an exemplary embodiment of the present invention, there is provided an X-ray detector comprising a detection module that includes a plurality of gate lines and a plurality of photoelectric transducers connected to the gate lines, respectively, and that converts X-ray radiation into an electric signal; a data reading module that sequentially scans the gate lines, generates a dummy dark level by reading electric signals of the photoelectric transducers during a standby period, generates an offset dark level by reading electric signals from the photoelectric transducers before the photographing or irradiation of a specimen, and generates a bright level by reading electric signals from the photoelectric signals after the photographing of a specimen during an X-ray projection period; and a data processing module that ignores the dummy dark level and generates image data using the bright level and the offset dark level.

According to an exemplary embodiment of the present invention, there is provided an X-ray detector comprising a detection module that includes a plurality of gate lines and a plurality of photoelectric transducers connected to the gate lines, respectively, and that converts X-ray radiation into an electric signal; a data reading module that sequentially scans the gate lines, generates a dummy dark level by reading electric signals of the photoelectric transducers during a standby period, generates a bright level by reading electric signals from the photoelectric transducers after the photographing or irradiation of a specimen, and then generates an offset dark level by reading electric signals from the photoelectric signals during an X-ray projection period; and a data processing module that ignores the dummy dark level and generates image data using the bright level and the offset dark level.

According to an exemplary embodiment of the present invention, there is provided a method of driving an X-ray detector comprising providing a plurality of gate lines and a plurality of photoelectric transducers connected to the gate lines, respectively, and converting X-ray radiation into an electric signal; sequentially scanning the gate lines and generating a dummy dark level by reading electric signals of the photoelectric transducers during a standby period; generating an offset dark level before the photographing or irradiation of a specimen by reading electric signals from the photoelectric transducers and generating a bright level by reading electric signals from the photoelectric signals during an X-ray projection period; and ignoring the dummy dark level and generating image data using the bright level and the offset dark level.

According to an exemplary embodiment of the present invention, there is provided a method of driving an X-ray detector comprising providing a plurality of gate lines and a plurality of photoelectric transducers connected to the gate lines, respectively, and converting X-ray radiation into an electric signal; sequentially scanning the gate lines and generating a dummy dark level by reading electric signals of the photoelectric transducers during a standby period; generating a bright level after the photographing or irradiation of a specimen by reading electric signals from the photoelectric transducers and generating an offset dark level by reading electric signals from the photoelectric signals during an X-ray projection period; and ignoring the dummy dark level and generating image data using the bright level and the offset dark level.

DETAILED DESCRIPTION OF EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those of ordinary skill in the art, and the present invention will only be defined by the appended claims. Like reference numerals refer to like elements throughout the specification.

Figure 1:
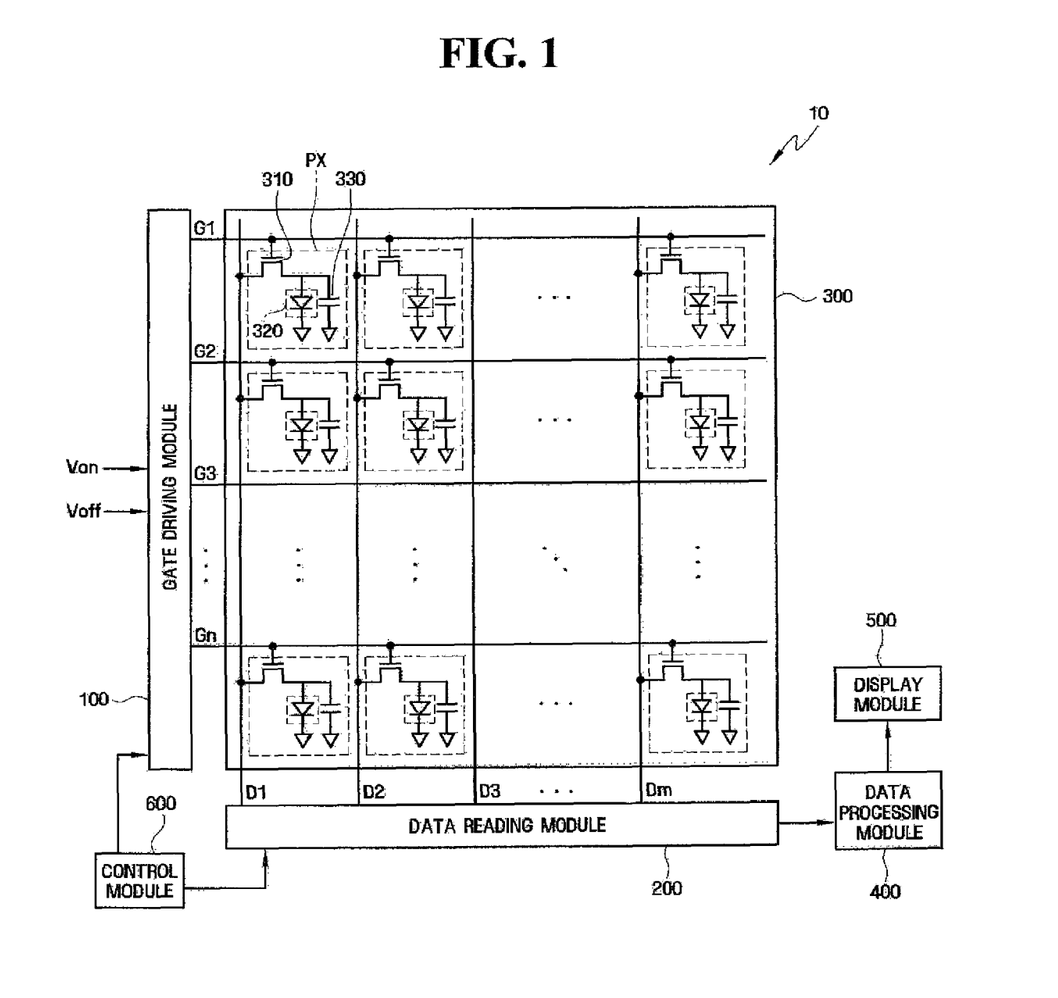
FIG. 1 is a block diagram of an X-ray detector according to an exemplary embodiment of the present invention.
Figure 3:
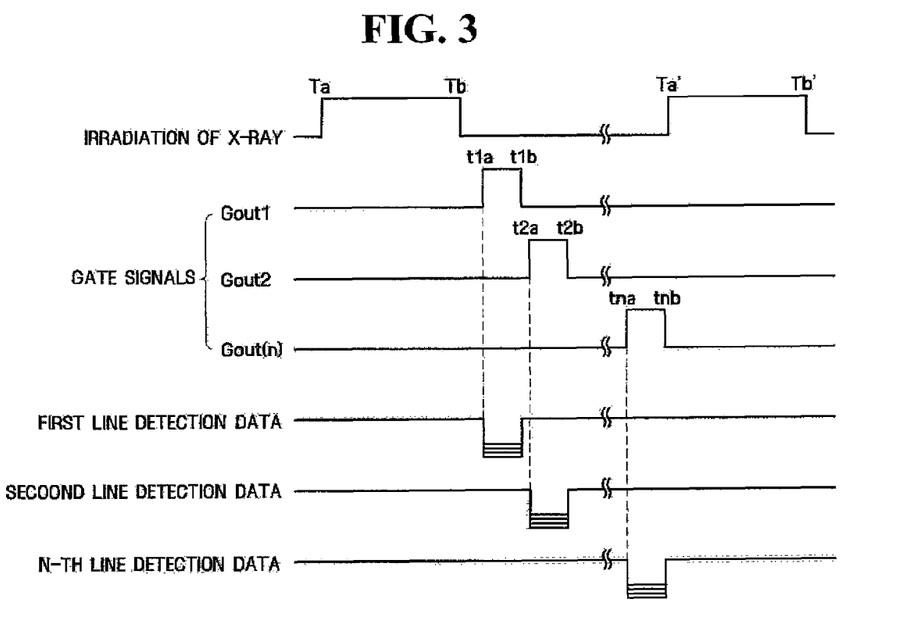
FIG. 3 is a timing diagram for explaining the operation of the X-ray detector shown in FIG. 1.
Figure 4:
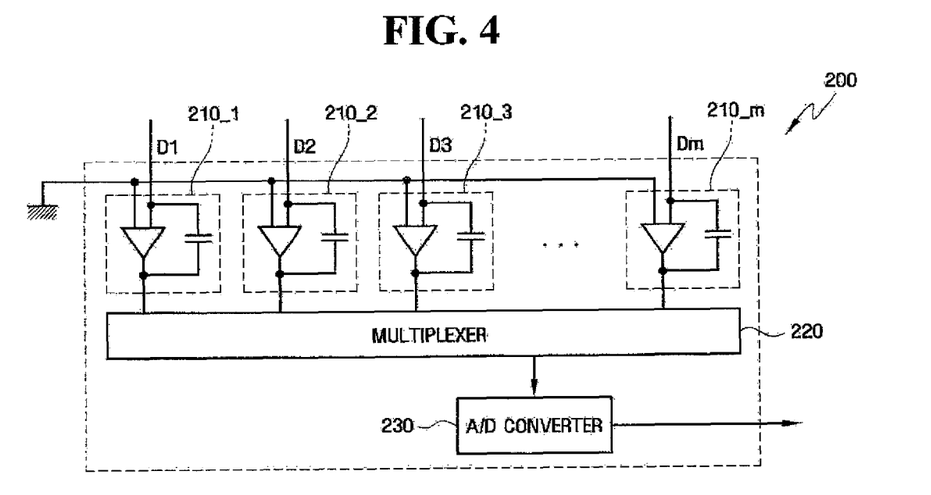
FIG. 4 is a circuit diagram of a data reading module used in the detector shown in FIG. 1.
Figure 5:
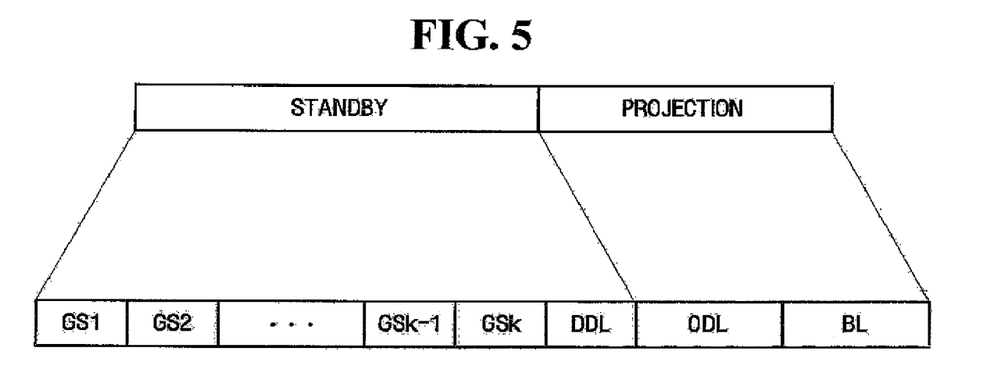
FIG. 5 is a diagram for explaining the operation of the data reading module used in the detector shown in FIG. 1.
Figure 6A:
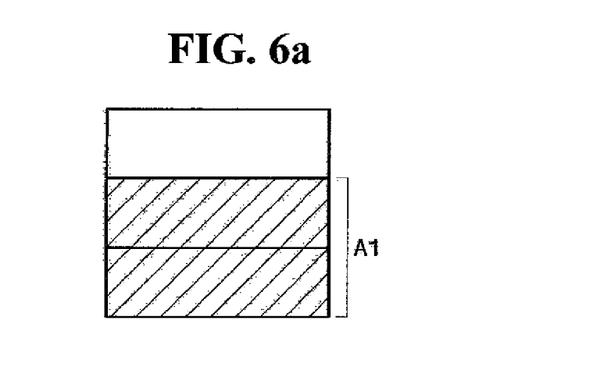
FIGS. 6a and 6b are diagrams for explaining variations in the charge level of a plurality of photoelectric transducers shown in FIG. 1 during the scanning of a plurality of gate lines by the detection module used in the detector shown in FIG. 1.
Figure 6B:
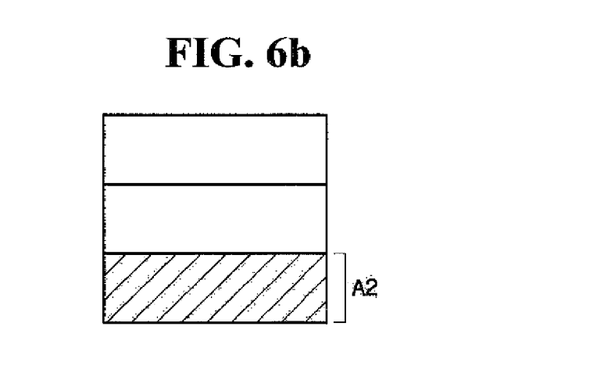
Figure 7A:
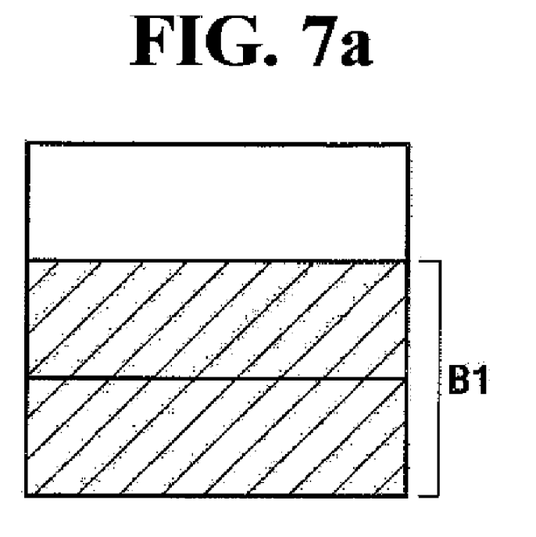
FIGS. 7a and 7b are diagrams for explaining variations in the charge level of the photoelectric transducers used in the detector shown in FIG. 1 during the generation of a dummy dark level by the detection module used in the detector shown in FIG. 1.
Figure 7B:
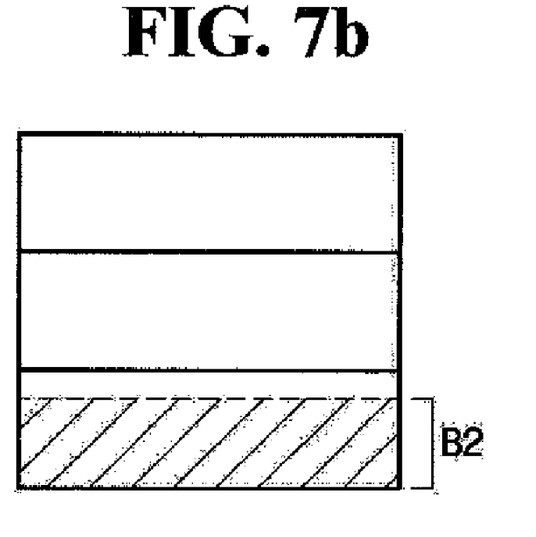
Figure 8:
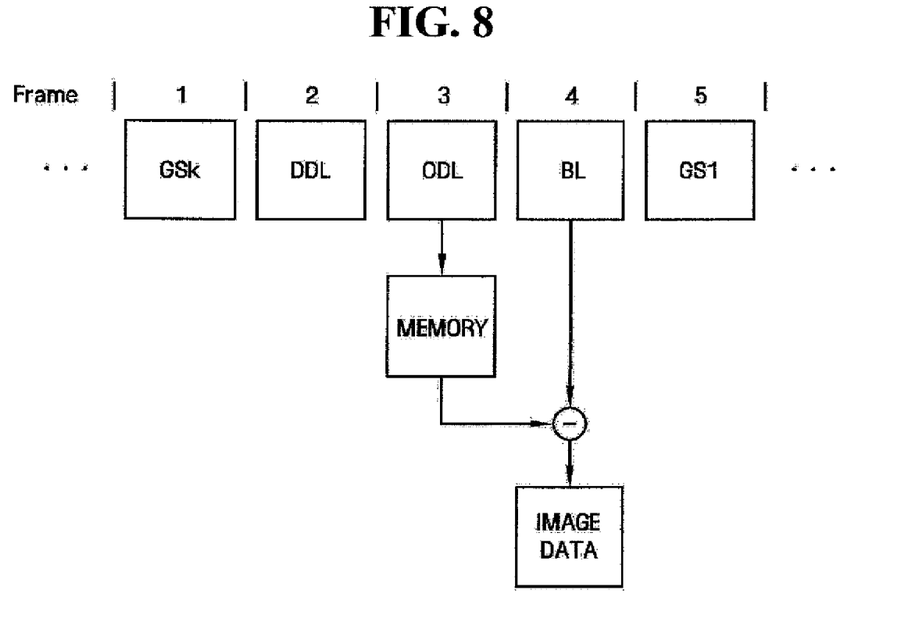
FIG. 8 is a diagram for explaining the operation of a data processing module used in the detector shown in FIG. 1.

Hereinafter, an X-ray detector and a method of driving the same, according to exemplary embodiments of the present invention, will be described in detail with reference to FIGS. 1 through 8. FIG. 1 is a block diagram of an X-ray detector 10 according to an exemplary embodiment of the present invention, FIG. 2 is a schematic diagram of a detection module 300 shown in FIG. 1, FIG. 3 is a timing diagram for explaining the operation of the X-ray detector 10, FIG. 4 is a circuit diagram of a data reading module 200 shown in FIG. 1, FIG. 5 is a diagram for explaining the operation of the data reading module 200, FIGS. 6a and 6b are diagrams for explaining variations in the charge level of a plurality of photoelectric transducers 320 shown in FIG. 1 during the scanning of a plurality of gate lines G1 through Gn by the detection module 300, FIGS. 7a and 7b are diagrams for explaining variations in the charge level of the photoelectric transducers 320 during the generation of a dummy dark level by the detection module 300, FIG. 8 is a diagram for explaining the operation of a data processing module 400 shown in FIG. 1.

Referring to FIG. 1, the X-ray detector 10 may include the detection module 300, a gate driving module 100, the data reading module 200, the data processing module 400, a display module 500, and a control module 600.

The detection module 300 may include a plurality of display signal lines (G1 through Gn and D1 through Dm) and a plurality of pixels PX connected to the display signal lines (G1 through Gn and D1 through Dm) and arranged in a matrix. Each of the pixels may include a photoelectric transducer 320 sensing radiation and generating an amount of charge corresponding to the amount of radiation sensed, a capacitor 330 accumulating the charge generated by the photoelectric transducer 320, and a switching device 310 transmitting the charge accumulated in the capacitor 330 in response to a control signal, for example, a gate signal. More specifically, a first end of the photoelectric transducer 320 and a first end of the capacitor 330 may be connected to, for example, the source terminal of the transistor 310, a second end of the photoelectric transducer 320 may be connected to a bias power source (not shown) or a ground source, and a second end of the capacitor 330 may be connected to a ground source.

Figure 2:
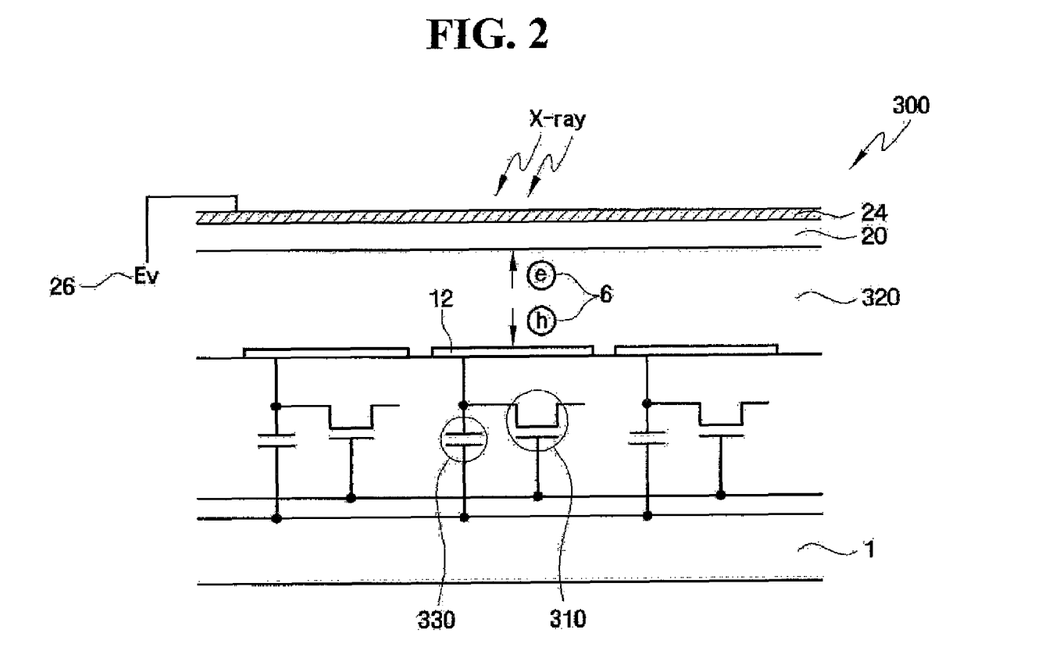
FIG. 2 is a schematic diagram of a detection module used in the detector shown in FIG. 1.

Referring to FIG. 2, the detection module 300 may include a substrate 1, a plurality of the switching devices 310, a plurality of the capacitors 330, a plurality of pixel electrodes 12, a plurality of the photoelectric transducers 320, a passivation layer 20, an electrode 24, and a high-voltage direct-current (DC) power source 26. The photoelectric transducers 320 may generate an electric signal, that is, an electron-hole pair 6 corresponding to the intensity of an external signal, such as electric waves or magnetic waves incident thereupon. The photoelectric transducers 320 may serve as converters converting external radiation, for example, X-rays, into an electric signal. The electron-hole pair 6 may gather in each of the pixel electrodes 12, which are disposed below the photoelectric transducers 320, as charge due to a predetermined voltage Ev. The charge gathered in each of the pixel electrodes 12 may accumulate in a corresponding capacitor 330, which is formed along with a common electrode. Then, the charge accumulated in each of the capacitors 330 may be transmitted to the data processing module 400 and, thus, an image may be displayed.

Referring to FIG. 1, the display signal lines (G1 through Gn and D1 through Dm) may include the gate lines G1 through Gn transmitting a gate signal and a plurality of data lines D1 through Dm transmitting an electric signal generated by each of the pixels PX to the data reading module 200. The gate lines G1 through Gn may extend substantially in a row direction and in parallel with one another. The data lines D1 through Dm may extend substantially in a column direction and are substantially parallel with one another.

The gate driving module 300 may be provided with a gate control signal from by the control module 600 and may sequentially apply a gate signal to the gate lines G1 through Gn. The gate control signal is a signal for controlling the operation of the gate driving module 300, and may be obtained by combining a gate-on voltage Von and a gate-off voltage Voff provided by a gate-on/off voltage generation module (not shown).

The data reading module 200 may be provided with a reading control signal from the control module 600 and may read an electric signal provided by the detection module 300. More specifically, the data reading module 200 may read an electric signal provided by each of the photoelectric transducers 320 and may generate a dummy dark level DDL, an offset dark level ODL, and a bright level BL. This will be described hereinbelow in more detail.

The data processing module 400 which is provided with the dummy dark level DDL, the offset dark level ODL and the bright level BL, can ignore the dummy dark level DDL and can generate image data based on the bright level BL and the offset dark level ODL. Thereafter, the data processing module 400 transmits the image data to the display module 500 so that the display module 500 can display an image corresponding to the image data.

The control module 600 can provide the gate control signal to the gate driving module 100 and thus control a plurality of gate signals Gout1 through Gout(n) provided to the gate lines G1 through Gn by the gate driving module 100. In addition, the control module 600 can provide the reading control signal to the data reading module 200 and thus control the time of generation of the dummy dark level DDL. That is, the control module 600 can control the reading of electric signals from the photoelectric transducers 320 by the data reading module 200.

The operation of the X-ray detector 10 will hereinafter be described with reference to FIG. 3.

Referring to FIG. 3, if a specimen (not shown) is irradiated by X-rays during a time period between Ta and Tb, the photoelectric transducers 320 receive the radiation transmitted through the specimen and accumulate an amount of charge corresponding to the amount of radiation received in their respective capacitors 330. Thereafter, in order to read the charge accumulated in the capacitors 330, the control module 600 provides the gate control signal to the gate driving module 100. Then, the gate driving module 100 sequentially applies the gate signals Gout1 through Gout(n) to the gate lines G1 through Gn. If the switching devices 310 are turned on in response to the gate signals Gout1 through Gout(n), the charge accumulated in each of the capacitors 330 can be output to the data lines D1 through Dm.

The data reading module 200 receives the charge levels of a plurality of rows of pixels PX respectively connected to the gate lines G1 through Gin as first through n-th line detection data in response to the application of the gate signals Gout1 through Gout(n) to the gate lines G1 through Gn. For example, if the first gate signal Gout1 is applied to the first gate line G1 during a time period between t1a and t1b, as shown in FIG. 3, a row of pixels PX connected to the first gate line G1 are driven, and the charge accumulated in each of the capacitors 330 of the row of pixels PX connected to the first gate line G1 is transmitted to the data reading module 200 as the first line detection data through the data lines D1 through Dm.

The structure and operation of the data reading module 200 will hereinafter be described in detail with reference to FIGS. 4 through 7b.

Referring to FIG. 4, the data reading module 200 may include a plurality of charge-to-voltage converters 210_1 through 210_m converting the first through n-th line detection data into voltages received through the data lines D1 through Dm, a multiplexer 220 performing parallel-to-serial conversion on each of the first through n-th line detection data and an analog-to-digital converter 230 converting an analog signal provided by the multiplexer 220 into a digital signal and transmitting the digital signal to the data processing module 400. The structure of the data reading module 200 is not restricted to that shown in FIG. 4. That is, the data reading module 200 may include various circuits, other than those shown in FIG. 4 (particularly, the charge-to-voltage converters 210_1 through 210_m), as long as it can convert charge received from each of the data lines D1 through Dm into a voltage.

Referring to FIG. 5, the data reading module 200 may have a standby period STANDBY and an irradiation period PROJECTION. More specifically, during the standby period STANDBY, the data reading module 200 may sequentially scan the gate lines G1 through Gn and may then generate a dummy dark level DDL by reading electric signals from the photoelectric transducers 320. During part of the irradiation period PROJECTION before the irradiation of a specimen, the data reading module 200 may generate an offset dark level ODL by reading electric signals from the photoelectric transducers 320. Once the specimen is irradiated with the X-rays, the data reading module 200 can generate a bright level BL by reading electric signals from the photoelectric transducers 320 during the remainder of the irradiation period PROJECTION. The data reading module 200 can generate the offset dark level ODL after the generation of the dummy dark level DDL.

During the standby period STANDBY, the gate driving module 100 sequentially applies the gate signals Gout1 through Gout(n) to the gate lines G1 through Gn, and repeatedly performs a gate scan operation GS that does not involve reading electric signals from the photoelectric transducers 320. Thereafter, the data reading module 200 can generate the dummy dark level DDL by reading electric signals from the photoelectric transducers 320. Variations in the charge level of the photoelectric transducers 320 during the repeated performing of a gate scan operation GS by the data reading module 200 are as shown in FIGS. 6a and 6b.

Referring to FIGS. 6a and 6b, the photoelectric transducers 320 may have a charge level A1 during a period before performing the gate scan operation GS by the data reading module 200. On the other hand, the photoelectric transducers 320 may have a charge level A2 during a period after performing the gate scan operation GS by the data reading module 200. During a time period between the end of the gate scan operation GS and the beginning of another gate scan operation GS, however, the charge level of the photoelectric transducers 320 may increase from A2 to A1 due to a leakage current. In order to address this problem, the data reading module 200 can repeatedly perform the gate scan operation GS and thus remove the charge accumulated in each of the photoelectric transducers 320 due to a leakage current. Therefore, the charge level of the photoelectric transducers 320 can be balanced, that is, can be made to vary between A1 and A2.

Once the repeated scanning of the gate lines G1 through Gn is complete, the data reading module 200 can read the electric signals from the photoelectric transducers 320 and thus generate a dummy dark level DDL during the remainder of the standby period STANDBY. The charge level of the photoelectric transducers 320 may be B1 when the data reading module 200 has not yet read the electric signals from the photoelectric transducers 320, as shown in FIGS. 7a and 7b. The charge level B1 may be substantially the same as an increased charge level of the photoelectric transducers 320 due to a leakage current generated after a k-th gate scan operation GSk, that is, the charge level A1 of FIG. 6a.

After the k-th gate scan operation GSk, the data reading module 200 reads the electric signals from the photoelectric transducers 320 and thus generates the dummy dark level DDL. Then, the charge level of the photoelectric transducers 320 will become level B2 shown in FIG. 7b. The data reading module 200 can generate more than one dummy dark level DDL by reading the electric signals from the photoelectric transducers 320 more than one time.

During the X-ray irradiation period PROJECTION, the data reading module 200 can read electric signals from the photoelectric transducers 320 and thus generate an offset dark level ODL until a specimen is irradiated. Thereafter, once the irradiating of the specimen is complete, the data reading module 200 can read the electric signals from the photoelectric transducers 320 and thus generate a bright level BL (see FIG. 5) during the remainder of the irradiation period PROJECTION. More specifically, the data reading module 200 generates a dummy dark level DDL, and then generates an offset dark level ODL by reading electric signals from the photoelectric transducers 320. Thereafter, the data reading module 200 generates a bright level BL. During the irradiation period PROJECTION, the specimen may be irradiated more than one time.

The charge level of the photoelectric transducers 320 during a period after the generation of the dummy dark level DDL by the data reading module 200 may be B2, which is different from the charge level of the photoelectric transducers 320 immediately after a gate scan operation, that is, the charge level A2 of FIG. 6b. Thus, the charge level of the photoelectric transducers 320 during a period after the generation of the offset dark level ODL by the data reading module 200 may be B2, rather than A2. That is, the charge level of the photoelectric transducers 320 may not be able to be balanced any longer after the generation of a dummy dark level DDL. Thus, it is possible to generate a stable offset dark level ODL by reading electric signals from the photoelectric transducers 320 again. Once an offset dark level ODL is stabilized, image data can be generated based on the offset dark level ODL and a bright level BL may be stabilized. Therefore, it is possible to improve the reliability of the X-ray detector 10.

The operation of the data processing module 400 will hereinafter be described in detail with reference to FIG. 8, which represents the flow of data from the data processing module 400.

Referring to FIG. 8, the data processing module 400 of FIG. 1 can receive a dummy dark level DDL, an offset dark level ODL and a bright level BL and may generate image data IMAGE DATA based only on the offset dark level ODL and the bright level BL. During a gate scan operation GS performed by the gate driving module 100, the data reading module 200 does not read any electric signals from the photoelectric transducers 320. Thus, the data processing module 400 can sequentially receive the dummy dark level DDL, the offset dark level ODL and the bright level BL after the k-th gate scan operation GSk. The data processing module 400 stores the offset dark level ODL in a memory, and can generate the image data IMAGE DATA by subtracting the offset dark level ODL from the bright level BL provided by the data reading module 200.

According to the exemplary embodiment of FIGS. 1 through 8, it is possible to apply a stable dark level to a bright level by generating a dummy dark level and an offset dark level and applying only the offset dark level to the bright level. Therefore, it is possible to acquire precise image data and thus to improve the reliability of an X-ray detector.

Figure 9:
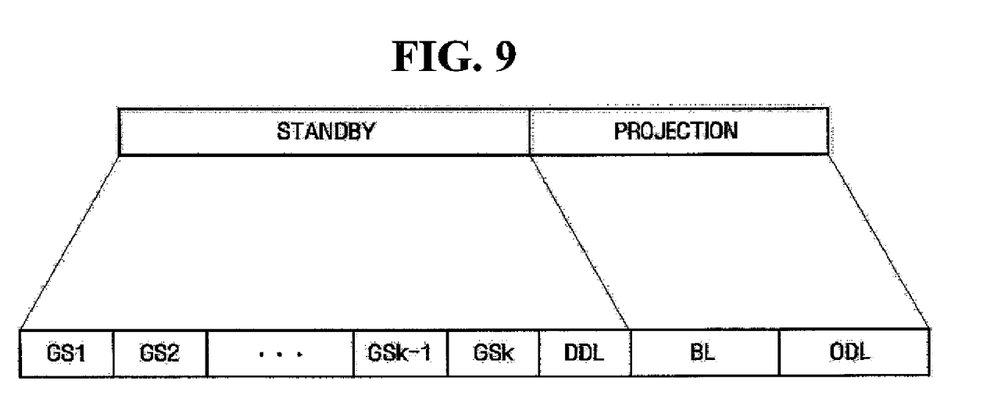
FIG. 9 is a diagram for explaining the operation of a data reading module of an X-ray detector according to an exemplary embodiment of the present invention.

An X-ray detector and a method of driving the same, according to an exemplary embodiment of the present invention, will hereinafter be described in detail with reference to FIGS. 9 and 10. FIG. 9 is a diagram for explaining the operation of a data reading module 200 of an X-ray detector shown in FIG. 1 according to an exemplary embodiment of the present invention, and FIG. 10 is a diagram for explaining the operation of a data processing module 400 of the X-ray detector according to the exemplary embodiment of FIG. 9.

The exemplary embodiment of FIG. 9 is different from the exemplary embodiment of FIGS. 1 through 8 in that the data reading module 200 generates a bright level BL first and then generates an offset dark level ODL. For convenience, the exemplary embodiment of FIG. 9 will hereinafter be described, focusing mainly on differences with the exemplary embodiment of FIGS. 1 through 8.

Referring to FIG. 9, the data reading module 200 may have a standby period STANDBY and an X-ray radiation period PROJECTION. More specifically, during the standby period STANDBY, the data reading module 200 can sequentially scan a plurality of gate lines G1 through Gn and then generate a dummy dark level DDL by reading the electric signals of a plurality of photoelectric transducers 320. During the X-ray radiation period PROJECTION, the irradiating of a specimen can be performed, and the data reading module 200 can generate a bright level BL by reading electric signals from the photoelectric transducers 320. In addition, once the specimen is X-rayed, the data reading module 200 can generate the offset dark level ODL by reading electric signals from the photoelectric transducers 320 during the remainder of the X-ray radiation period PROJECTION.

Figure 10:
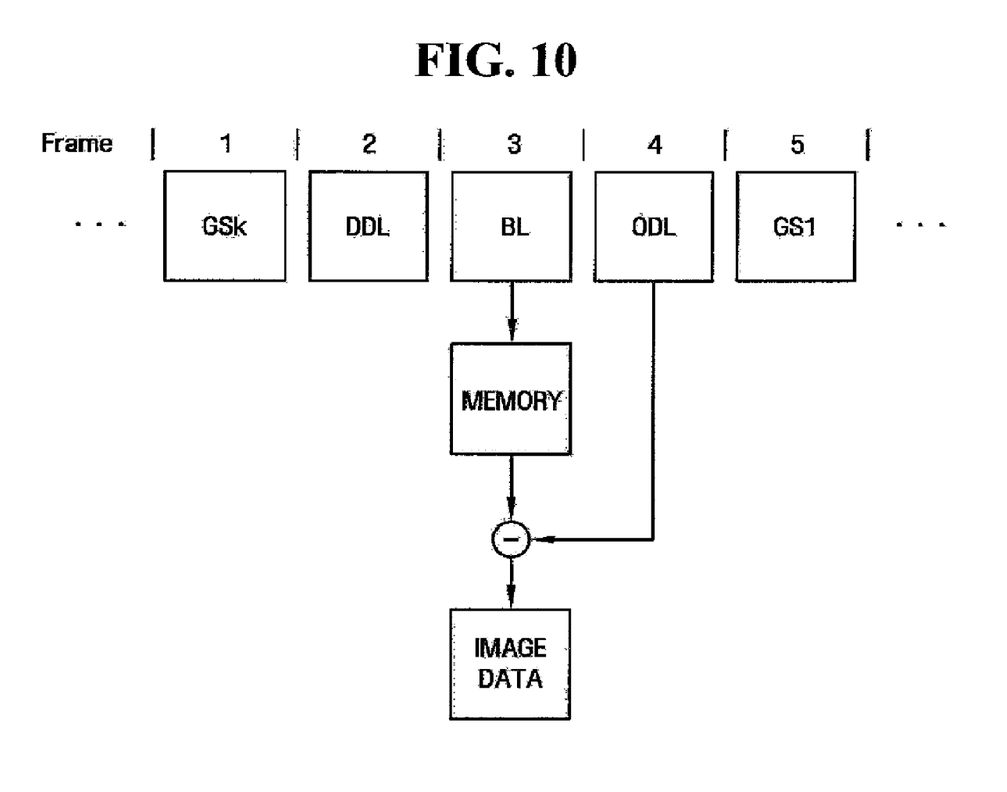
FIG. 10 is a diagram for explaining the operation of a data processing module of the X-ray detector according to the exemplary embodiment of FIG. 9.

In the exemplary embodiment of FIGS. 9 and 10, like in the exemplary embodiment of FIGS. 1 through 8, the charge level of the photoelectric transducers 320 may be relatively balanced during the standby period STANDBY and, particularly, during a gate scan operation GS. Thus, the photoelectric transducers 320 has a charge level A after the repeated scanning of the gate lines G1 through Gn and has a charge level B after the generation of a dummy dark level DDL, the charge levels A and B may be different from each other. During the X-ray radiation period PROJECTION, a specimen may be irradiated, and the data reading module 200 can generate a bright level BL and then generate an offset dark level ODL by reading the electric signals from the photoelectric transducers 320 again.

Referring to FIG. 10, the data processing module 400 receives a dummy dark level DDL, a bright level BL, and an offset dark level ODL from the data reading module 200, and can generate image data IMAGE DATA based only on the bright level BL and the offset dark level ODL.

More specifically, the data processing module 400 can sequentially receive the dummy dark level DDL, the bright level BL, and the offset dark level ODL after a k-th gate scan operation GSk. The data processing module 400 can ignore the dummy dark level DDL, and store the bright level in a memory. Then, the data processing module 400 generates the image data IMAGE DATA by subtracting the offset dark level ODL from the bright level BL.

According to the exemplary embodiment of FIGS. 9 and 10, it is possible to apply a stable dark level to a bright level by generating a dummy dark level and an offset dark level and applying only the offset dark level to the bright level. Therefore, it is possible to acquire precise image data and thus to improve the reliability of an X-ray detector.

What is claimed is:

1. An X-ray detector comprising:
   a detection module that includes a plurality of gate lines and a plurality of photoelectric transducers connected to the gate lines, respectively, to convert X-ray radiation into electric signals;
   a data reading module that sequentially scans the plurality of gate lines, generates a dummy dark level by reading the electric signals of the plurality of photoelectric transducers during a standby period, generates an offset dark level by reading the electric signals from the plurality of photoelectric transducers before irradiating a specimen, and generates a bright level by reading the electric signals from the photoelectric transducers after the irradiation of a specimen, during an X-ray radiation period; and
   a data processing module generates image data using the bright level and the offset dark level.

2. The X-ray detector of claim 1, wherein the data reading module generates the offset dark level immediately after the generation of the dummy dark level.

3. The X-ray detector of claim 2, wherein the data reading module generates more than one dummy dark level by reading the electric signals from the photoelectric transducers more than one time.

4. The X-ray detector of claim 1, further comprising a control module that provides a control signal to the data reading module to control the generation of the dummy dark level.

5. The X-ray detector of claim 1, wherein the data processing module stores the offset dark level and generates the image data by subtracting the offset dark level from the bright level.

6. The X-ray detector of claim 1, wherein the X-ray detector irradiates the specimen more than one time during the X-ray radiation period.

7. An X-ray detector comprising:
   a detection module that includes a plurality of gate lines and a plurality of photoelectric transducers connected to the plurality of gate lines, respectively, to convert X-ray radiation into electric signals;
   a data reading module that sequentially scans the plurality of gate lines generates a dummy dark level by reading the electric signals of the plurality of photoelectric transducers during a standby period, generates a bright level by reading the electric signals from the plurality of photoelectric transducers after irradiating a specimen, and then generates an offset dark level by reading the electric signals from the plurality of photoelectric transducers during an irradiation period; and a data processing module generates image data using the bright level and the offset dark level.

8. The X-ray detector of claim 7, wherein the data reading module generates the bright level immediately after generation of the dummy dark level.

9. The X-ray detector of claim 8, wherein the data reading module generates more than one dummy dark level by reading the electric signals from the plurality of photoelectric transducers more than one time.

10. The X-ray detector of claim 7, wherein the data processing module stores the bright level and generates the image data by subtracting the offset dark level from the bright level.

11. The X-ray detector of claim 7, wherein the X-ray detector irradiates the specimen more than one time during the irradiation period.

12. A method of driving an X-ray detector, the method comprising:

providing a plurality of gate lines and a plurality of photoelectric transducers connected to the plurality of gate lines, respectively, and converting X-ray radiation into electric signals;

sequentially scanning the gate lines and generating a dummy dark level by reading the electric signals of the plurality of photoelectric transducers during a standby period;

generating an offset dark level before irradiating a specimen by reading the electric signals from the plurality of photoelectric transducers and generating a bright level by reading the electric signals from the plurality of photoelectric transducers during an X-ray radiation period; and ignoring the dummy dark level and generating image data using only the bright level and the offset dark level.

13. The method of claim 12, wherein the generating of the offset dark level comprises generating the offset dark level immediately after the generating of the dummy dark level.

14. The method of claim 13, wherein the generating of the dummy dark level comprises generating more than one dummy dark level by reading the electric signals from the plurality of photoelectric transducers more than one time.

15. The method of claim 12, wherein the generating of the image data comprises storing the offset dark level and generating the image data by subtracting the offset dark level from the bright level.

16. The method of claim 12, further comprising irradiating the specimen more than one time during the X-ray radiation period.

17. A method of driving an X-ray detector, the method comprising:

providing a plurality of gate lines and a plurality of photoelectric transducers connected to the plurality of gate lines, respectively, and converting X-ray radiation into electric signals;

sequentially scanning the plurality of gate lines and generating a dummy dark level by reading the electric signals of the plurality of photoelectric transducers during a standby period;

generating a bright level after irradiating a specimen by reading the electric signals from the photoelectric transducers and generating an offset dark level by reading the electric signals from the plurality of photoelectric transducers during X-ray radiation period; and ignoring the dummy dark level and generating image data using only the bright level and the offset dark level.

18. The method of claim 17, wherein the generating of the bright level comprises generating the bright level immediately after the generating of the dummy dark level.

19. The method of claim 17, wherein the generating of the image data comprises storing the bright level and generating the image data by subtracting the offset dark level from the bright level.

20. The method of claim 17, further comprising irradiating the specimen more than one time during the X-ray radiation period.

* * * * *